United States Patent
Yang et al.

(10) Patent No.: US 10,119,843 B2
(45) Date of Patent: Nov. 6, 2018

(54) OPTICAL DETECTING DEVICE CAPABLE OF DETERMINING SHIFT OF A MULTI-AXIS INSTRUCTION OUTPUTTING MECHANISM

(71) Applicant: PixArt Imaging Inc., Hsin-Chu (TW)

(72) Inventors: Chung-Ting Yang, Hsin-Chu (TW); Chia-Fu Ke, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 44 days.

(21) Appl. No.: 15/466,891

(22) Filed: Mar. 23, 2017

(65) Prior Publication Data

US 2018/0052015 A1 Feb. 22, 2018

(30) Foreign Application Priority Data

Aug. 22, 2016 (TW) .............................. 105126687 A (51) Int. Cl.
*G01D 5/347* (2006.01)
(52) U.S. Cl.
CPC ....... *G01D 5/34707* (2013.01); *G01D 5/3473* (2013.01)
(58) Field of Classification Search
CPC .. G01D 5/3473; G01D 5/2451; G06F 3/0312; G06F 3/0362; G06F 3/03543; G06F 3/0338; G06F 3/0383; B60K 2350/1048
USPC ...................................................... 250/231.13
See application file for complete search history.

(56) References Cited

U.S. PATENT DOCUMENTS 5,912,661 A * 6/1999 Siddiqui .............. G01D 5/2451
345/157

* cited by examiner

*Primary Examiner* — Que T Le
(74) *Attorney, Agent, or Firm* — Winston Hsu (57) ABSTRACT

An optical detecting device includes a multi-axis instruction outputting mechanism and an optical detecting module, and shift of the multi-axis instruction outputting mechanism is determined accordingly. An actuating component of the multi-axis instruction outputting mechanism is moved in reciprocation at a first operating direction to output an instruction. The optical detecting module is disposed by the actuating component. An interval between the optical detecting module and the actuating component is varied according to a relative movement between the optical detecting module and the actuating component at a second operating direction, and the actuating component can be shifted between different gears. The optical detecting module determines the interval and related gearshift according to variation of a reflecting signal actuated by the actuating component, and utilizes the reflecting signal to acquire a movement of a feature point on the actuating component along the first operating direction to interpret the instruction.

12 Claims, 7 Drawing Sheets

OPTICAL DETECTING DEVICE CAPABLE OF DETERMINING SHIFT OF A MULTI-AXIS INSTRUCTION OUTPUTTING MECHANISM

BACKGROUND OF THE INVENTION

1. Field of the Invention

The present invention relates to an optical detecting device, and more particularly, to an optical detecting device capable of determining gearshift, such as determining shift of a multi-axis instruction outputting mechanism.

2. Description of the Prior Art

A conventional optical mouse utilizes an optical detector to detect a rotary direction and a rotary angle of a mouse roller. An optical detecting signal emitted by the optical detector is projected onto a detective surface of the roller, a feature point is disposed on the detective surface of the roller, and the optical detector detects a movement of the feature point to determine the rotary direction and the rotary angle of the roller while the roller is rotated, and outputs a corresponding operation instruction. It is to say, an application function of the optical detector is limited to detect rotation parameter variation of the mouse roller, and design of expanding the application function of the optical detector to allow the optical detector for detecting parameter variation of the mouse roller and parameters of other adjusting mechanism is an important issue in the related mechanical design industry.

SUMMARY OF THE INVENTION

The present invention provides an optical detecting device capable of determining gearshift, such as determining shift of a multi-axis instruction outputting mechanism for solving above drawbacks.

According to the claimed invention, an optical detecting device capable of determining gearshift includes a multi-axis instruction outputting mechanism and an optical detecting module. An actuating component of the multi-axis instruction outputting mechanism is shifted in reciprocation at a first operating direction to output a corresponding instruction. The optical detecting module is disposed adjacent by the actuating component. An interval between the optical detecting module and the actuating component is varied according to a relative movement between the optical detecting module and the actuating component at a second operating direction. The actuating component is arbitrarily shifted between different gears. The optical detecting module determines the interval and related gearshift according to parameter variation of a reflecting signal actuated by the actuating component, and utilizes the reflecting signal to acquire a movement of a feature point on the actuating component along the first operating direction, so as to interpret the instruction. The first operating direction is different from the second operating direction.

According to the claimed invention, the optical detecting device further includes a light sheltering unit disposed on the light emitting unit. The reflecting signal is correlative to a projective pattern formed by the light sheltering unit, and the operating processor analyzes the projective pattern to calculate the interval. The operating processor analyzes dimensions and/or boundary contrast of the projective pattern. The operating processor analyzes an average value, a differential value, a maximal value, a minimal value and/or weighting relation about foresaid values of the dimensions and/or the boundary contrast.

According to the claimed invention, a stereoscopic structure is formed on the actuating component, the reflecting signal is affected by the stereoscopic structure to generate a fringe pattern, the optical detecting device analyzes the reflecting signal having the fringe pattern to determine the interval and/or the movement of the feature point. The stereoscopic structure is the feature point of the actuating component.

In the present invention, structural design of the multi-axis instruction outputting mechanism is not limited to the roller mechanism and the knob mechanism of the above-mentioned embodiments. The actuating component can be shifted relative to the supporter for gearshift, or the actuating component and the supporter can be reversely shifted relative to the base for gearshift. Any optical detecting device having an outputting mechanism provided with multi-axis adjusting property and matched with the optical detecting module capable of analyzing relative shift variation of the multi-axis instruction outputting mechanism belongs to a scope of the present invention. In conclusion, the optical detecting device of the present invention utilizes the particular mechanical design to allow the optical detecting module for simultaneously detecting three-dimensional reciprocation (which means reciprocation of three operating directions) of the multi-axis instruction outputting mechanism, such as gearshift, rolling and pressing detection of the mouse roller, or gearshift, rotation and pressing detection of the rotary knob. The present invention can optimize application range of the optical detecting device for preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
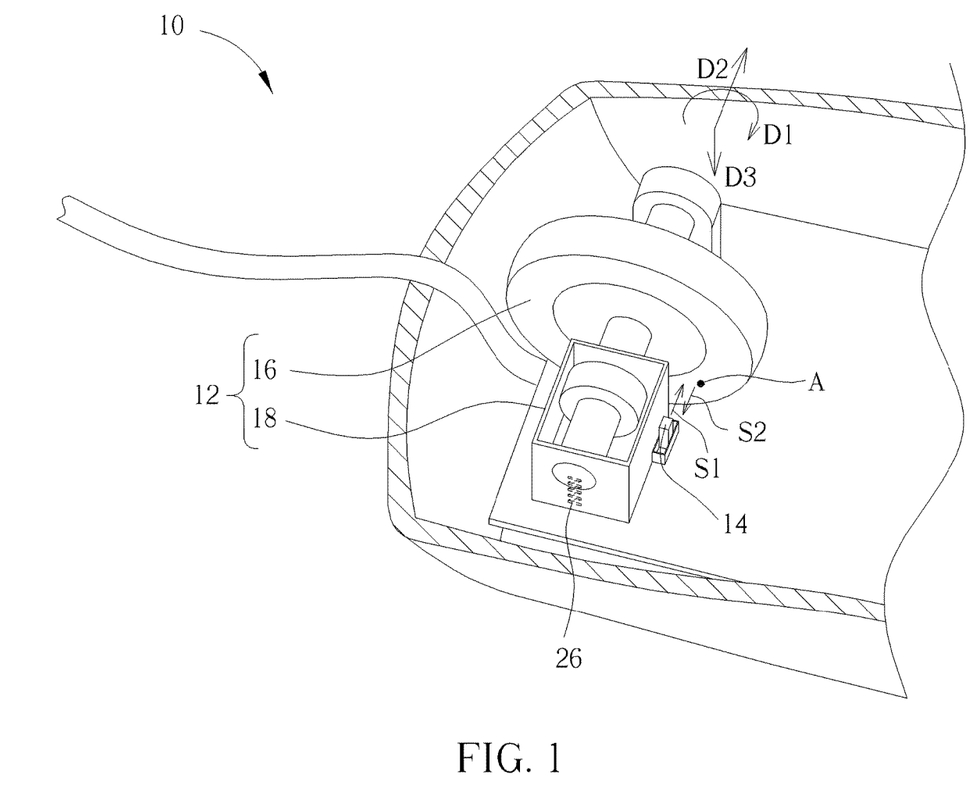
FIG. 1 is a diagram of an optical detecting device according to a first embodiment of the present invention.
Figure 2:
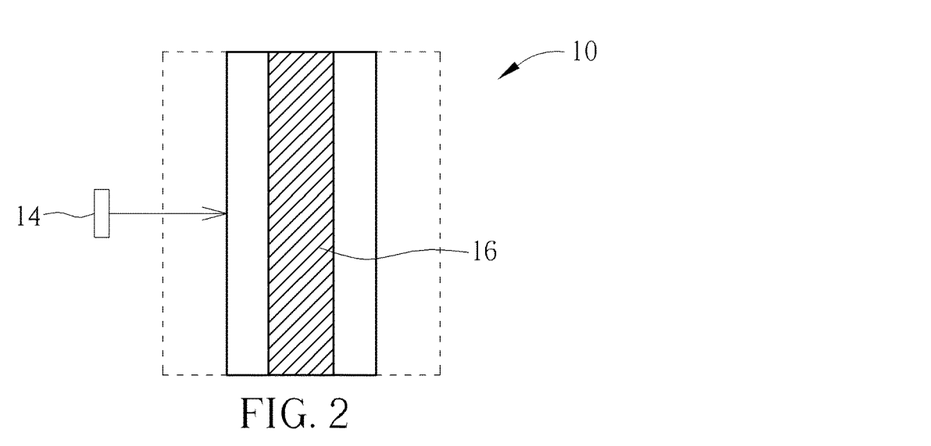
FIG. 2 is a top view of part of the optical detecting device shown in FIG. 1.
Figure 3:
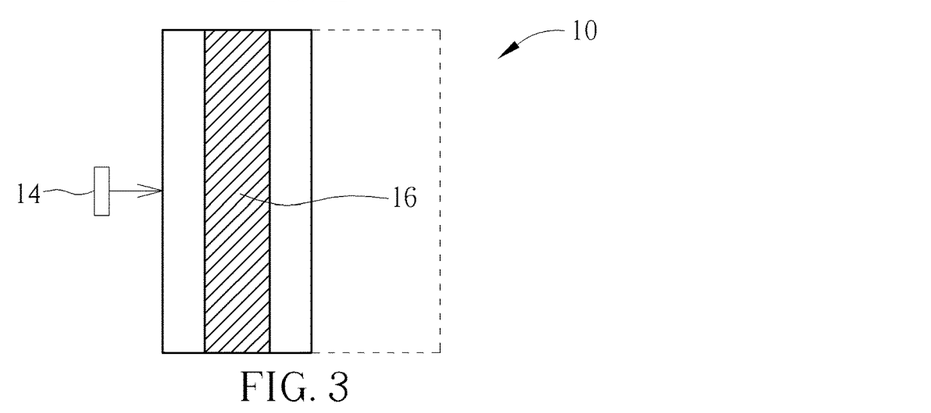
FIG. 3 and FIG. 4 are top views of the optical detecting device in another operation mode shown in FIG. 2.
Figure 4:
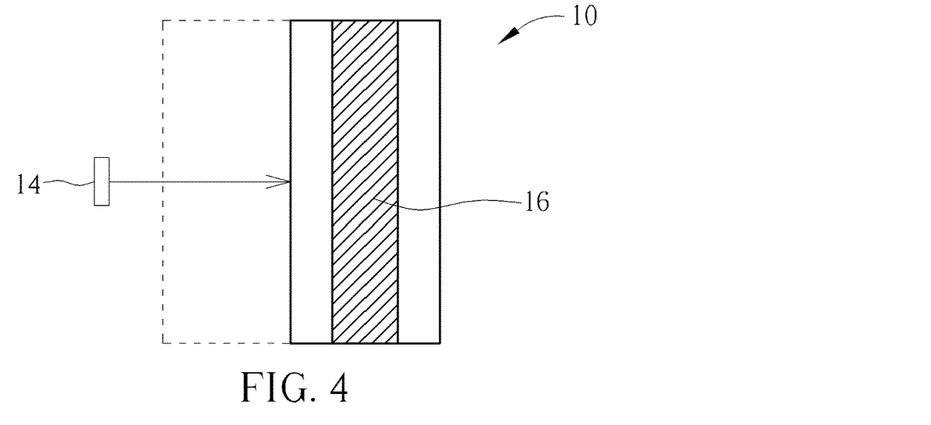

Please refer to FIG. 1 to FIG. 4. FIG. 1 is a diagram of an optical detecting device 10 according to a first embodiment of the present invention. FIG. 2 is a top view of part of the optical detecting device 10 shown in FIG. 1. FIG. 3 and FIG.

4 are top views of the optical detecting device 10 in another operation mode shown in FIG. 2. The optical detecting device 10 can be applied to an optical mouse. The optical detecting device 10 includes a multi-axis instruction outputting mechanism 12 and an optical detecting module 14. An actuating component 16 of the multi-axis instruction outputting mechanism 12 is movably disposed on a supporter 18. The user can move the actuating component 16 in reciprocation at a first operating direction D1 to output a corresponding operation instruction; for example, the user can rotate the actuating component 16 by fingers at a clockwise direction or a counterclockwise direction. In the embodiment, the actuating component 16 further provide a gearshift function, the user can move the actuating component 16 at a second operating direction D2, the actuating component 16 is shifted relative to the supporter 18 and changed between different gears. The actuating component 16 shifted in reciprocation at the first operating direction D1 may correspond to different operation instructions while the actuating component 16 is stayed at different gears.

Figure 5:
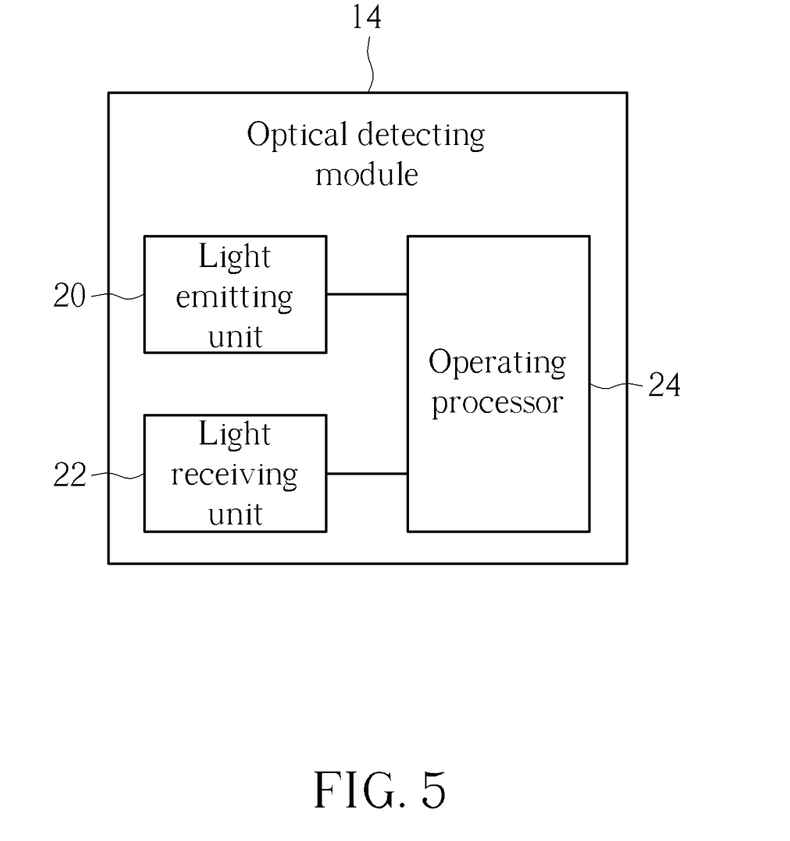
FIG. 5 is a functional block diagram of an optical detecting module according to the embodiment of the present invention.

Please refer to FIG. 5. FIG. 5 is a functional block diagram of the optical detecting module 14 according to the embodiment of the present invention. The optical detecting module 14 is disposed adjacent by the actuating component 16. The optical detecting module 14 includes a light emitting unit 20, a light receiving unit 22 and an operating processor 24. A detecting signal S1 output by the light emitting unit 20 can be projected onto the actuating component 16 to obtain information of a feature point A. The detecting signal S1 is reflected from the feature point A to transform into a reflecting signal S2, and the light receiving unit 22 receives the reflecting signal S2 to acquire the information of the feature point A. The operating processor 24 is electrically connected to the light emitting unit 20 and the light receiving unit 22. The operating processor 24 analyzes a movement of the feature point A along the first operating direction D1 within an image formed by the reflecting signal S2, so as to interpret the corresponding operation instruction. For example, the feature point A moving to left represents the actuating component 16 is rotated at the clockwise direction, and sound volume of the speaker can be decreased; the feature point A moving to right represents the actuating component 16 is rotated at the counterclockwise direction, and the sound volume of the speaker can be increased accordingly. An actual application of the actuating component 16 is not limited to the above-mentioned embodiment.

The optical detecting module 14 of the present invention further can determine gearshift of the actuating component 16. While the actuating component 16 is shifted between different gears, parameters of the reflecting signal S2 received by the light receiving unit 22 is varied accordingly; for example, the parameter variation can be intensity variation of the reflecting signal S2, and the optical detecting module 14 can calculate interval variation between the optical detecting module 14 and the actuating component 16 according to the intensity variation of the reflecting signal S2. While the actuating component 16 is shifted from the gear shown in FIG. 2 to the gear shown in FIG. 3, the actuating component 16 is near to the optical detecting module 14, the reflecting signal S2 received by the light receiving unit 22 has great intensity; while the actuating component 16 is shifted from the gear shown in FIG. 2 to the gear shown in FIG. 4, the actuating component 16 is far from the optical detecting module 14, the reflecting signal S2 received by the light receiving unit 22 has low intensity. Therefore, the optical detecting module 14 can determine whether the actuating component 16 is shifted close to or away from the optical detecting module 14 by analyzing parameter variation of the reflecting signal S2, and decide a current gear of the actuating component 16 accordingly.

It should be mentioned that a relative movement between the optical detecting module 14 and the actuating component 16 at the second operating direction D2 can have several situations. First, the optical detecting module 14 is motionless, and the actuating component 16 is shifted at the second operating direction D2 to vary the related interval between the optical detecting module 14 and the actuating component 16 for gearshift. Second, the actuating component 16 is motionless, and the optical detecting module 14 is shifted at the second operating direction D2 to vary the related interval. Third, the optical detecting module 14 and the actuating component 16 are shifted reversely in reciprocation to gain a sufficient shifting stroke within limited structural space, and the third situation needs precise gearshift mechanism. The gearshift method of the optical detecting device 10 in the present invention is not limited to the above-mentioned embodiments, which depends on design demand.

The first operating direction D1 can be a rotation direction of the actuating component 16, the second operating direction D2 can be a shift direction of the actuating component 16 relative to the supporter 18, and the first operating direction D1 is different from the second operating direction D2. The actuating component 16 handled at different operating directions can be represented as outputting different operation instructions. As shown in FIG. 1, while the detecting signal S1 of the light emitting unit 20 is projected onto the actuating component 16, a transmission direction of the detecting signal S1 is almost parallel to a planar normal vector (which is similar to the second operating direction D2) of a lateral surface of the actuating component 16; however, a placed angle of the actuating component 16 relative to the optical detecting module 14 may be crooked during assembly procedure of the optical detecting device 10, the parameter variation of the detecting signal S1 can clearly correspond to interval variation between the actuating component 16 and the optical detecting module 14 on condition that a gearshift direction (which means the second operating direction D2) of the actuating component 16 is not perpendicular to the transmission direction of the detecting signal S1, and the optical detecting module 14 is able to accurately determine the gearshift of the actuating component 16 while shifting.

The actuating component 16 further can be shifted relative to the supporter 18 in reciprocation at a third operating direction D3 to output another kind of operation instruction. The actuating component 16 and the supporter 18 can utilize a resilient recovering force of a resilient component 26 to generate reciprocation in the third operating direction D3; meanwhile, the optical detecting module 14 can analyze the movement of the feature point A along the third operating direction D3 to determine the corresponding operation instruction. For example, while the optical detecting device 10 is an optical mouse and the multi-axis instruction outputting mechanism 12 is located at the gear shown in FIG. 2, reciprocation of the actuating component 16 in the first operating direction D1 can adjust shift of the web page displayed on the computer screen, reciprocation of the actuating component 16 in the third operating direction D3 corresponds to press of a middle button of the optical mouse; while the multi-axis instruction outputting mechanism 12 is shifted from the gear shown in FIG. 2 to the gear shown in FIG. 3 along the second operating direction D2, reciprocation of the actuating component 16 in the first operating direction D1 can adjust the sound volume of music broadcasted by the computer host, reciprocation of the actuating component 16 in the third operating direction D3 corresponds to the play/stop button of music program; while the multi-axis instruction outputting mechanism 12 is shifted to the gear shown in FIG. 4 along the second operating direction D2, the reciprocation of the actuating component 16 in the first operating direction D1 can zoom in/zoom out an image displayed on the computer host, and the reciprocation of the actuating component 16 in the third operating direction D3 corresponds to the recover button of photo program.

Figure 6:
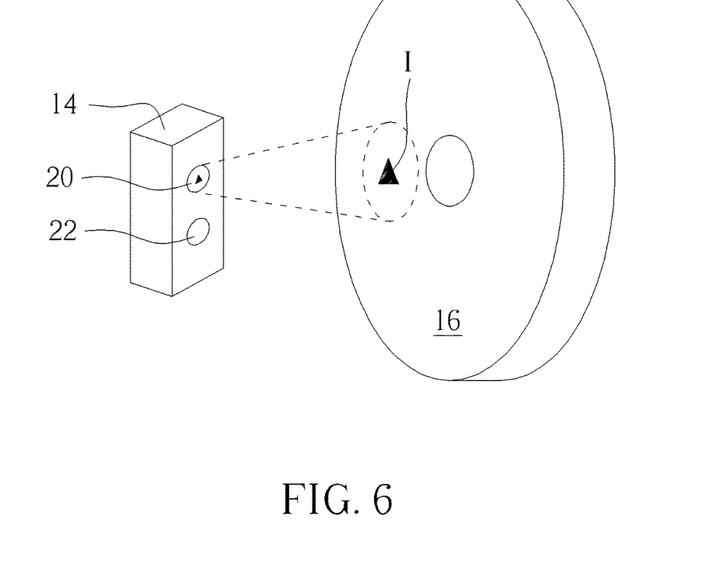
FIG. 6 is a diagram of the optical detecting module according to another embodiment of the present invention.

Please refer to FIG. 6. FIG. 6 is a diagram of the optical detecting module 14 according to another embodiment of the present invention. The optical detecting module 14 can dispose a light sheltering unit 28 on a lens of the light emitting unit 20, a part of the detecting signal S1 is sheltered by the light sheltering unit 28, and the surplus detecting signal S1 projected onto the actuating component 16 can generate a projective pattern I formed by the light sheltering unit 28. The reflecting signal S2 received by the light receiving unit 22 contains parameter information of the projective pattern I, the operating processor 24 analyzes the parameter information to calculate the interval variation between the optical detecting module 14 and the actuating component 16. For example, the projective pattern I having enlarged dimensions represents the optical detecting module 14 is near to the actuating component 16, and the projective pattern I having reduced dimensions represents the optical detecting module 14 is far from the actuating component 16, so as to determine the gearshift of the actuating component 16. In addition, the projective pattern I having great boundary contrast (such as a clear boundary) represents the actuating component 16 is shifted into a focus range of the optical detecting module 14, and the projective pattern I having low boundary contrast (such as a blurred boundary) represents the actuating component 16 is shifted out of the focus range of the optical detecting module 14; thus, the gearshift of the actuating component 16 can be determined accurately.

It should be mentioned that the operating processor 24 can merely analyze dimension variation of the projective pattern I or boundary contrast vibration of the projective pattern I, or simultaneously variation of the dimensions and the boundary contrast of the projective pattern I. An average value, a differential value, a maximal value, a minimal value and/or weighting relation about foresaid values of the dimensions and/or the boundary contrast of the projective pattern I can be applied to calculate the relative interval variation between the optical detecting module 14 and the actuating component 16, and is helpful to determine the gearshift adjustment of the multi-axis instruction outputting mechanism 12.

Figure 7:
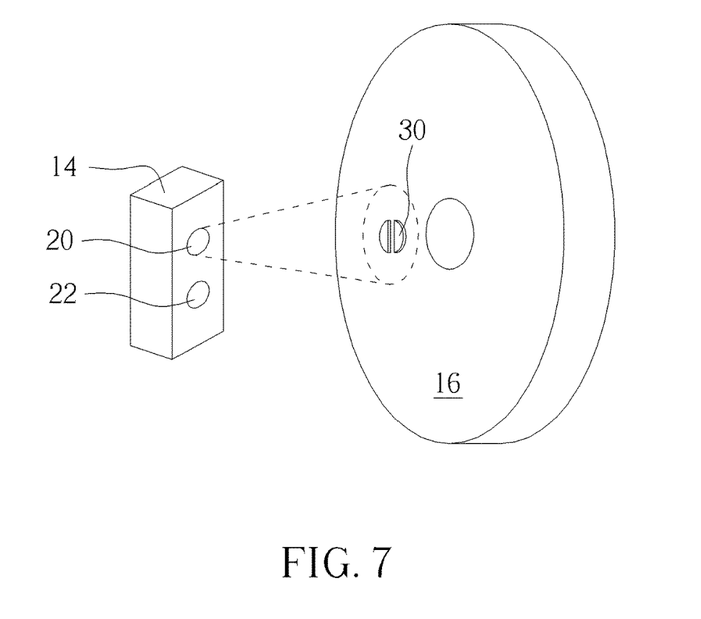
FIG. 7 is a diagram of an actuating component according to another embodiment of the present invention.

Please refer to FIG. 7. FIG. 7 is a diagram of the actuating component 16 according to another embodiment of the present invention. A specific stereoscopic structure 30 can be formed on a detective surface of the actuating component 16. The reflecting signal S1 from the light emitting unit 20 is affected by the stereoscopic structure 30 to generate a fringe pattern, the light receiving unit 22 receives the reflecting signal S2 having the fringe pattern, and variation of the fringe pattern can be utilized to acquire a rotary angle and/or the relative interval of the actuating component 16. The stereoscopic structure 30 can be the feature point A on the actuating component 16 (which is shown in FIG. 1), and the optical detecting module 14 analyzes the movement of the stereoscopic structure 30 to determine the operation instruction input by the actuating component 16 handled at the first operating direction D1. The stereoscopic structure 30 further can be a distinctive texture structure formed on the actuating component 16 and different from the feature point A, and the optical detecting module 14 utilizes the fringe pattern generated by the stereoscopic structure 30 to determine the interval between the optical detecting module 14 and the actuating component 16.

Figure 8:
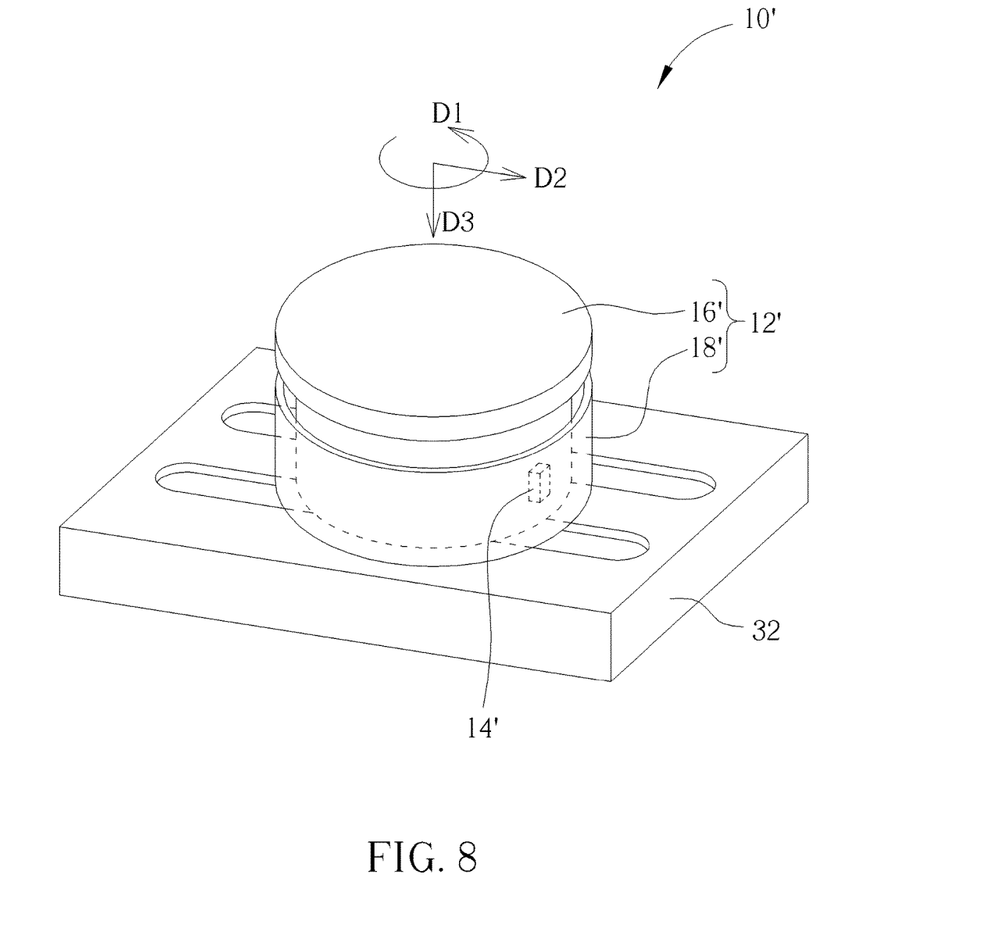
FIG. 8 is a diagram of the optical detecting device according to the second embodiment of the present invention.
Figure 9:
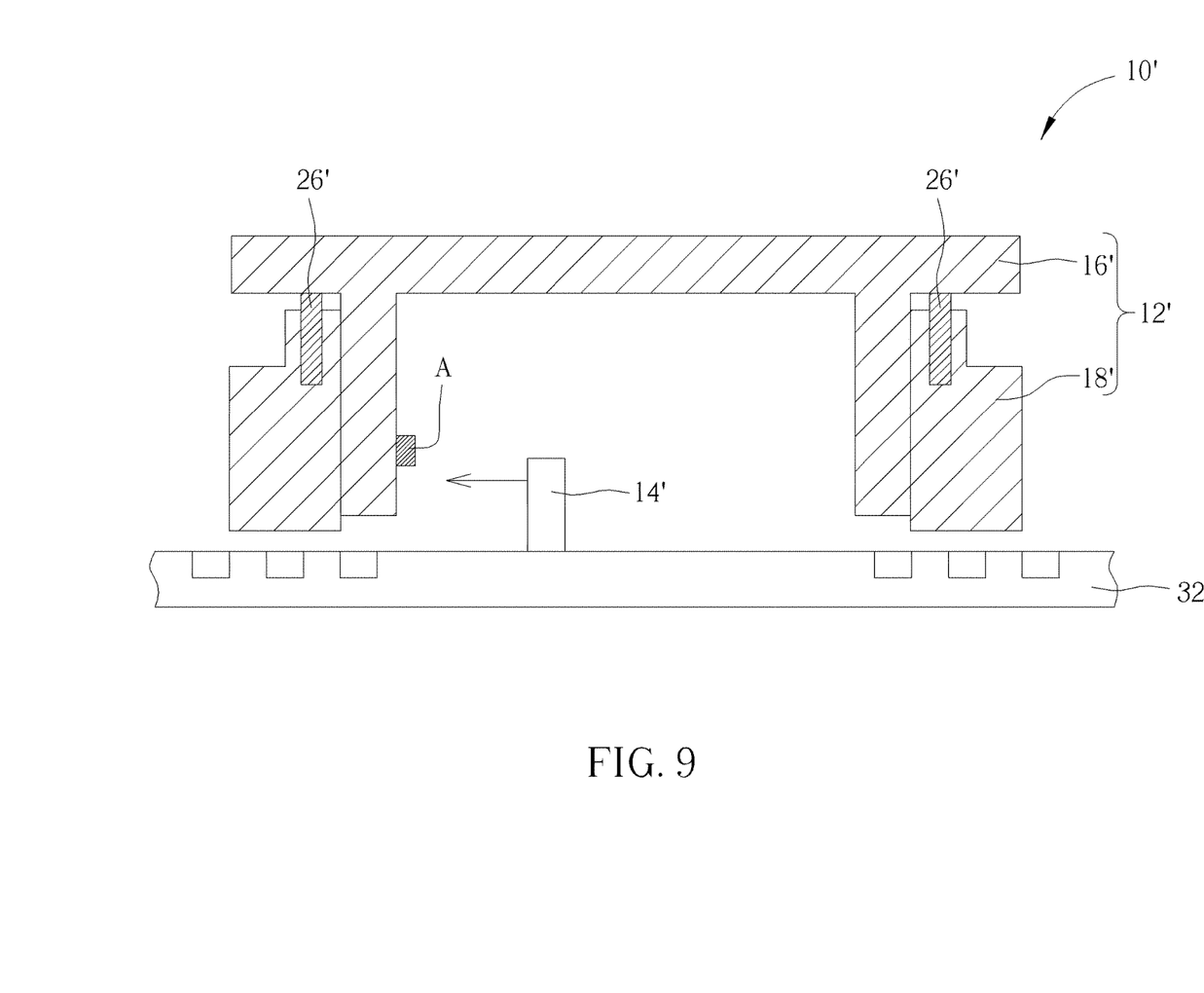
FIG. 9 is a lateral view of the optical detecting device shown in FIG. 8.
Figure 10:
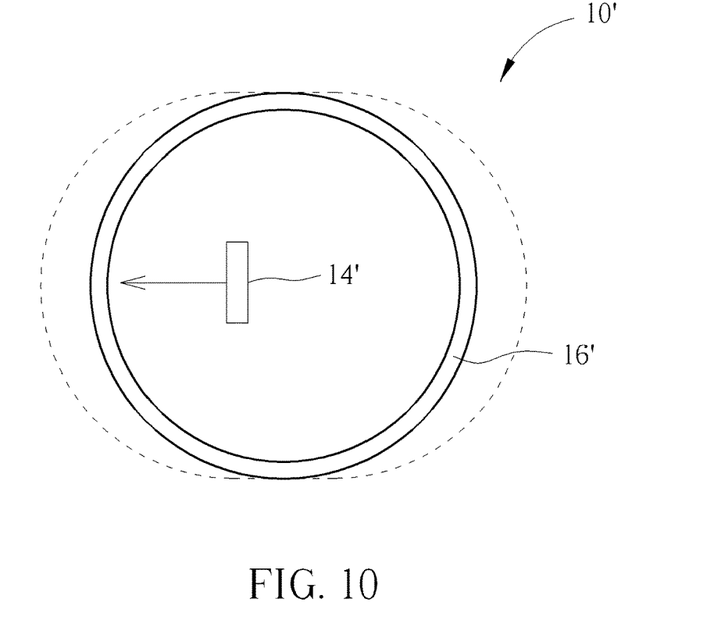
FIG. 10 is a top view of part of the optical detecting device shown in FIG. 8.
Figure 11:
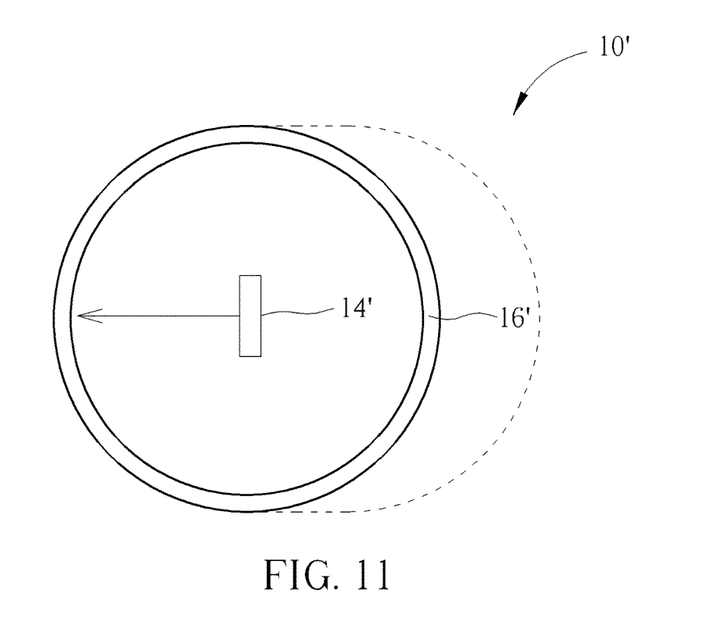
FIG. 11 is a top view of the optical detecting device in another operation mode shown in FIG. 9.

Please refer to FIG. 8 to FIG. 11. FIG. 8 is a diagram of the optical detecting device 10' according to the second embodiment of the present invention. FIG. 9 is a lateral view of the optical detecting device 10' shown in FIG. 8. FIG. 10 is a top view of part of the optical detecting device 10' shown in FIG. 8. FIG. 11 is a top view of the optical detecting device 10' in another operation mode shown in FIG. 9. The optical detecting device 10' can be applied to an adjusting knob, such as knobs on the air conditioner, the radio, or any household apparatus and automotive apparatus. The multi-axis instruction outputting mechanism 12' of the optical detecting device 10' is movably disposed on a base 32, for example, the supporter 18' is assembled with a track of the base 32 and the actuating component 16' is movably connected to the supporter 18'. The optical detecting module 14' is fixed onto the base 32.

While the actuating component 16' is rotated in reciprocation at the first operating direction D1, the optical detecting module 14' can detect the rotary direction and the rotary angle of the actuating component 16' to output the corresponding operation instruction; while the actuating component 16' is shifted in reciprocation at the second operating direction D2, the optical detecting module 14' can detect the interval variation of the actuating component 16' to determine the gearshift of the multi-axis instruction outputting mechanism 12'; while the actuating component 16' is handled in reciprocation at the third operating direction D3, the optical detecting module 14' can detect lift and drop of the actuating component 16' to output another kind of operation instruction. The actuating component 16' utilizes the resilient recovering force of the resilient component 26' to recover level of the actuating component 16' relative to the supporter 18' along the third operating direction D3.

For example, while the optical detecting device 10' is the adjusting knob of the air conditioner and the multi-axis instruction outputting mechanism 12' is located at the gear shown in FIG. 10, reciprocation of the actuating component 16' in the first operating direction D1 can be used to adjust temperature of the air conditioner, and reciprocation of the actuating component 16' in the third operating direction D3 can be used to actuate a confirm function, a switch function or a setting function of temperature adjustment; while the multi-axis instruction outputting mechanism 12' is shifted to the gear shown in FIG. 11 along the second operating direction D2, reciprocation of the actuating component 16' in the first operating direction D1 can adjust flow volume of the air conditioner, reciprocation of the actuating component 16' in the third operating direction D3 can actuate the confirm function, the switch function or the setting function of flow volume adjustment. The multi-axis instruction outputting mechanism 12' further can be shifted from the gear shown in FIG. 10 to right and located at another gear (not shown in figures). An amount of gearshift of the multi-axis instruction outputting mechanism in the present invention is not limited to the first embodiment and the second embodiment mentioned as above, and depends on design demand.

The optical detecting module of the second embodiment include the light emitting unit, the light receiving unit and the operating processor accordingly, the light sheltering unit can be disposed on the light emitting unit of the optical detecting module, and the stereoscopic structure can be formed on the actuating component; application of the said elements is similar to the optical detecting module and the actuating component of the first embodiment, and a detailed description is omitted herein for simplicity. In addition, structural design of the multi-axis instruction outputting mechanism is not limited to the roller mechanism and the knob mechanism of the above-mentioned embodiments. The actuating component can be shifted relative to the supporter for gearshift, or the actuating component and the supporter can be reversely shifted relative to the base for gearshift. Any optical detecting device having an outputting mechanism provided with multi-axis adjusting property and matched with the optical detecting module capable of analyzing relative shift variation of the multi-axis instruction outputting mechanism belongs to a scope of the present invention. In conclusion, the optical detecting device of the present invention utilizes the particular mechanical design to allow the optical detecting module for simultaneously detecting three-dimensional reciprocation (which means reciprocation of three operating directions) of the multi-axis instruction outputting mechanism, such as gearshift, rolling and pressing detection of the mouse roller, or gearshift, rotation and pressing detection of the rotary knob. The present invention can optimize application range of the optical detecting device for preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device capable of determining gearshift, comprising:
    a multi-axis instruction outputting mechanism, an actuating component of the multi-axis instruction outputting mechanism being shifted in reciprocation at a first operating direction to output a corresponding instruction; and
    an optical detecting module disposed adjacent by the actuating component, an interval between the optical detecting module and the actuating component being varied according to a relative movement between the optical detecting module and the actuating component at a second operating direction, the actuating component being arbitrarily shifted between different gears, the optical detecting module determining the interval and related gearshift according to parameter variation of a reflecting signal actuated by the actuating component and utilizing the reflecting signal to acquire a movement of a feature point on the actuating component along the first operating direction so as to interpret the instruction, wherein the first operating direction is different from the second operating direction.

2. The optical detecting device of claim 1, wherein the actuating component is shifted to a corresponding gear by moving the optical detecting module relative to the motionless actuating component in reciprocation, moving the actuating component relative to the motionless optical detecting module in reciprocation, or moving the optical detecting module and the actuating component reversely in reciprocation.

3. The optical detecting device of claim 1, further comprising:
    a light emitting unit adapted to output a detecting signal;
    a light receiving unit adapted to receive the reflecting signal transformed by the detecting signal reflected from the actuating component; and
    an operating processor electrically connected to the light emitting unit and the light receiving unit, the operating processor analyzing the parameter variation of the reflecting signal and the movement of the feature point within an image formed by the reflecting signal, to determine a current gear of the actuating component and the corresponding instruction output by the actuating component.

4. The optical detecting device of claim 3, wherein the second operating direction is not perpendicular to a transmission direction of the detecting signal.

5. The optical detecting device of claim 1, wherein the parameter variation is intensity variation of the reflecting signal, and the interval is calculated by the optical detecting device according to the intensity variation.

6. The optical detecting device of claim 3, further comprising:
    a light sheltering unit disposed on the light emitting unit, the reflecting signal being correlative to a projective pattern formed by the light sheltering unit, the operating processor analyzing the projective pattern to calculate the interval.

7. The optical detecting device of claim 6, wherein the operating processor analyzes dimensions and/or boundary contrast of the projective pattern.

8. The optical detecting device of claim 7, wherein the operating processor analyzes an average value, a differential value, a maximal value, a minimal value and/or weighting relation about foresaid values of the dimensions and/or the boundary contrast.

9. The optical detecting device of claim 1, wherein a stereoscopic structure is formed on the actuating component, the reflecting signal is affected by the stereoscopic structure to generate a fringe pattern, the optical detecting device analyzes the reflecting signal having the fringe pattern to determine the interval and/or the movement of the feature point.

10. The optical detecting device of claim 9, wherein the stereoscopic structure is the feature point of the actuating component.

11. The optical detecting device of claim 1, wherein the actuating component is further moved in reciprocation at a third operating direction to output another instruction while shifting to any gear, and the third operating direction is different from the first operating direction and the second operating direction.

12. The optical detecting device of claim 11, wherein the reflecting signal is utilized to acquire another movement of the feature point along the third operating direction for interpreting another instruction.

* * * * *